US008528874B2

(12) United States Patent
Gregg et al.

(10) Patent No.: US 8,528,874 B2
(45) Date of Patent: *Sep. 10, 2013

(54) HYBRID CONTOURED LOAD-SPREADING WASHER

(75) Inventors: Paul S. Gregg, Seattle, WA (US); Jack Esposito, Auburn, WA (US); Lee C. Firth, Renton, WA (US); Kenneth J. Hunziker, Renton, WA (US)

(73) Assignee: The Boeing Company, Chicago, IL (US)

(*) Notice: Subject to any disclaimer, the term of this patent is extended or adjusted under 35 U.S.C. 154(b) by 451 days.

This patent is subject to a terminal disclaimer.

(21) Appl. No.: 11/749,895

(22) Filed: May 17, 2007

(65) Prior Publication Data
US 2008/0286073 A1    Nov. 20, 2008

(51) Int. Cl.
*B64D 11/00*    (2006.01)
(52) U.S. Cl.
USPC ............... 248/429; 244/118.6; 296/65.13; D8/399
(58) Field of Classification Search
USPC ............... 248/429; 244/118.6; 296/65.13; D8/399
See application file for complete search history.

(56) References Cited

U.S. PATENT DOCUMENTS

| 271,365 | A | | 1/1883 | Rodney | |
|---|---|---|---|---|---|
| 3,184,769 | A | | 5/1965 | Barwood | |
| 3,415,064 | A | * | 12/1968 | Talobre | 411/531 |
| 3,873,168 | A | * | 3/1975 | Viola et al. | 428/113 |
| 4,110,056 | A | * | 8/1978 | Stevenson | 416/230 |
| 4,399,642 | A | * | 8/1983 | Bard et al. | 52/787.12 |
| 4,444,587 | A | | 4/1984 | Kelly | |
| 4,512,699 | A | | 4/1985 | Jackson et al. | |
| 4,530,147 | A | | 7/1985 | Mattei et al. | |
| 4,749,610 | A | | 6/1988 | Katsuragawa et al. | |
| 4,778,702 | A | | 10/1988 | Hutter, III | |
| 4,842,912 | A | | 6/1989 | Hutter, III | |
| 5,431,518 | A | * | 7/1995 | Young et al. | 411/429 |
| 5,444,603 | A | * | 8/1995 | Otsuka et al. | 411/339 |
| 5,489,180 | A | | 2/1996 | Ichihara et al. | |
| 5,500,272 | A | | 3/1996 | Padden | |
| 5,888,012 | A | * | 3/1999 | Nygren et al. | 411/113 |

(Continued)

FOREIGN PATENT DOCUMENTS

| EP | 0619441 | 10/1994 |
|---|---|---|
| WO | 2006102090 | 9/2006 |
| WO | 2007090188 | 8/2007 |
| WO | PCT/US2008/063547 | 5/2008 |

OTHER PUBLICATIONS

United States Patent and Trademark Office, "Final Office Action," issued in connection with U.S. Appl. No. 12/117,185, mailed Dec. 29, 2011, 10 pages.

(Continued)

*Primary Examiner* — Mark Wendell
*Assistant Examiner* — Matthew J Smith
(74) *Attorney, Agent, or Firm* — Hanley, Flight and Zimmerman, LLC.

(57) ABSTRACT

A hybrid contoured load-spreading washer is disclosed. An illustrative embodiment of the washer includes a washer body having a composite layer and a metal layer bonded to the composite layer and a fastener opening extending through the washer body. A floor beam seat track attachment assembly and a method of transmitting a load from a seat track to a floor beam web in a seat track attachment assembly are also disclosed.

20 Claims, 2 Drawing Sheets

(56) References Cited

U.S. PATENT DOCUMENTS

| | | | |
|---|---|---|---|
| 6,129,326 | A | 10/2000 | Mandon |
| 6,287,664 | B1 | 9/2001 | Pratt |
| 6,467,521 | B1 | 10/2002 | Pratt |
| 7,160,630 | B2 * | 1/2007 | Klos .............................. 411/378 |
| 7,207,523 | B2 * | 4/2007 | Callahan et al. ........... 244/118.6 |
| 2002/0187020 | A1 | 12/2002 | Julien |
| 2003/0116395 | A1 | 6/2003 | Kettler et al. |
| 2005/0117998 | A1 | 6/2005 | Patell |
| 2006/0062650 | A1 | 3/2006 | Keener |
| 2006/0214058 | A1 | 9/2006 | Westre et al. |
| 2009/0003965 | A1 | 1/2009 | Gregg et al. |

OTHER PUBLICATIONS

United States Patent and Trademark Office, "Non-Final Office Action," issued in connection with U.S. Appl. No. 12/117,185, mailed Jan. 24 2011, 14 pages.

United States Patent and Trademark Office, "Advisory Action," issued in connection with U.S. Appl. No. 12/117,185, mailed Oct. 1, 2010, 2 pages.

United States Patent and Trademark Office, "Final Office Action," issued in connection with U.S. Appl. No. 12/117,185, mailed Aug. 31, 2010, 7 pages.

United States Patent and Trademark Office, "Non-Final Office Action," issued in connection with U.S. Appl. No. 12/117,185, mailed Mar. 30, 2010, 16 pages.

United States Patent and Trademark Office, "Non-Final Office Action," issued in connection with U.S. Appl. No. 12/117,185, mailed Sep. 19, 2011, 9 pages.

United States Patent and Trademark Office, "Final Office Action," issued in connection with U.S. Appl. No. 12/117,185, mailed May 23, 2011, 10 pages.

International Searching Authority, "Search Report," issued in connection with International Application No. PCT/US2008/063547, mailed on Mar. 5, 2009, 3 pages.

International Searching Authority, "International Preliminary Report on Patentability," issued in connection with International Application No. PCT/US2008/063547, mailed on Nov. 17, 2009, 6 pages.

International Searching Authority, "Written Opinion," issued in connection with International Application No. PCT/US2008/063547, mailed on Mar. 5, 2009, 5 pages.

United States Patent and Trademark Office, "Final Office Action," issued in connection with U.S. Appl. No. 12/117,185, mailed Dec. 29, 2011, 11 pages.

United States Patent and Trademark Office, "Notice of Allowance," issued in connection with U.S. Appl. No. 12/117,185, mailed on Nov. 16, 2012, 13 pages.

United States Patent and Trademark Office, "Non-Final Office Action," issued in connection with U.S. Appl. No. 12/117,185, mailed on Jun. 27, 2012, 17 pages.

* cited by examiner

HYBRID CONTOURED LOAD-SPREADING WASHER

FIELD

The present invention relates to bolted joints. More particularly, the present invention relates to a hybrid contoured load-spreading washer which is suitable for optimally distributing loads in a bolted joint such as a seat track assembly, for example.

BACKGROUND

In many structural applications, particularly aerospace applications, local load paths at attachments often require efficient local strengthening and stiffening. One widely-acceptable method for accomplishing this objective includes the use of "radius-filling" shaped washers to attach structural members to each other. The general function of these washers is to divert and reduce concentrated loads in a circuitous load path without adding excessive weight or cost. The key material properties desired in structural members include high shear stiffness, high shear strength and low density such that the members can be as thick as possible, enhancing load-carrying capability. For example, the seat track attachments in the floor structure of aircraft must be designed to withstand various types of loads. One such load case is the 9G forward crash case. This particular load case causes a severe vertical load in the seat tracks due to the overturning effect of the seat structure when occupied by passengers. The high vertical load must be reacted through the seat track-to-floor beam connection.

A typical manner of rendering the seat track-to-floor beam connection sufficiently strong for the 9G forward crash case includes locally increasing thicknesses of the seat track flanges, the floor beam web, or both where these components are bolted together. While this is feasible using machined parts or built-up assemblies, it is more difficult or expensive to accomplish using automated laser-welded structure with secondarily bonded composite caps.

The geometric features of the seat track-to-floor beam connection require unique solutions for the attachment. Composite floor beams having flat or planar webs conventionally use "radius-filling" washers to help spread the load from the bolted connection into the web. The washers are typically metal and nest closely to the cap-to-web intersection. In the case of "sine-wave" floor beam webs, however, conventional "radius-filling" washers are not able to nest into the web-to-cap intersection.

Conventional "radius-filling" washers are aluminum, which has good specific shear strength to density ratio. Due to corrosion issues, however, aluminum parts are not allowed on many advanced composite structures. One disadvantage which is inherent in conventional radius-filling washers is that the washers are incapable of nesting with the "sine-wave" floor beam web configuration. Furthermore, because they are monolithic metal pieces, the washers are not structurally efficient to an optimum degree in the transmission of bolt loads to a floor beam web in a seat track attachment assembly.

SUMMARY

The present invention is generally directed to a hybrid contoured load-spreading washer. An illustrative embodiment of the washer includes a washer body having a composite layer and a metal layer bonded to the composite layer and a fastener opening extending through the washer body. The present invention is further generally directed to a seat track attachment assembly and a method of transmitting a load from a seat track to a floor beam web in a seat track attachment assembly.

BRIEF DESCRIPTION OF THE DRAWINGS

The invention will now be described, by way of example, with reference to the accompanying drawings, in which.

DETAILED DESCRIPTION

Figure 1:
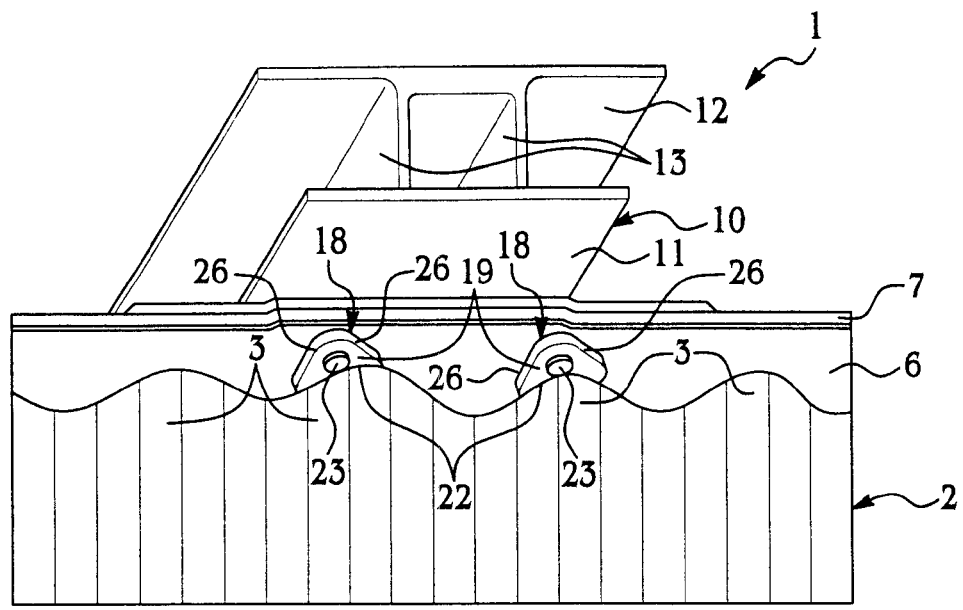
FIG. 1 is a perspective view of a seat track attachment assembly in typical implementation of an illustrative embodiment of the hybrid contoured load-spreading washer.

Referring to the drawings, an illustrative embodiment of the hybrid contoured load-spreading washer, hereinafter washer, is generally indicated by reference numeral 18. As shown in FIG. 1, at least one washer 18 is suitable for securing a seat track 10 to a floor beam web 2 in a seat track attachment assembly 1 of a passenger aircraft. However, it will be understood that the washer 18 is equally applicable to a variety of alternative bolted joint applications in which it is necessary to efficiently spread a load over a support structure.

As shown in FIG. 1, the seat track attachment assembly 1 includes the floor beam web 2, which is typically titanium and has an undulating "sine-wave" configuration, including multiple web ridges 3, for strength and rigidity. A planar metal floor beam cap 6, which is typically titanium, is provided on the floor beam web 2. A composite floor beam cap 7, which may be graphite, for example, is typically provided on the metal floor beam cap 6. The seat track 10 includes a bottom track flange 11 which rests on the composite floor beam cap 7. A pair of spaced-apart connecting flanges 13 extends from the bottom track flange 11. A top track flange 12 is provided on the connecting flanges 13. Passenger seats (not shown) are fastened to the top track flange 12 using techniques which are known to those skilled in the art.

Figure 2:
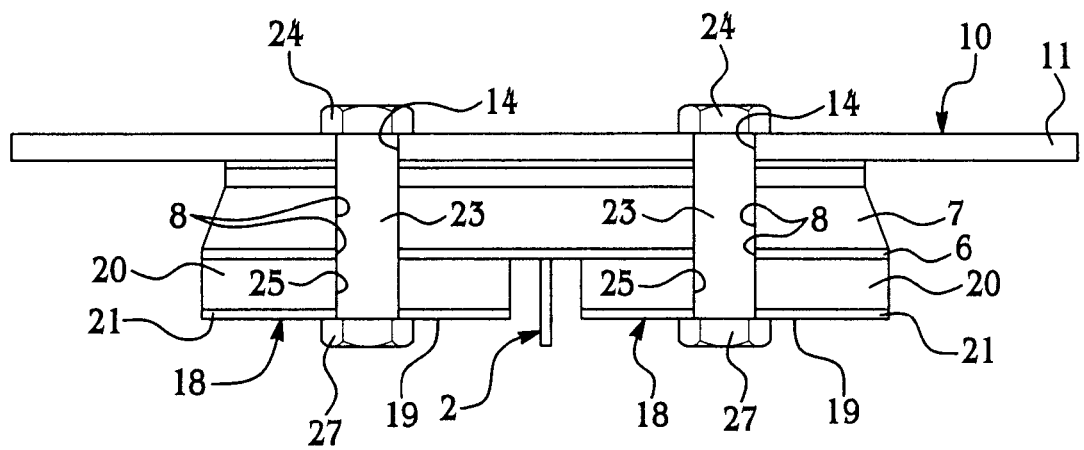
FIG. 2 is a cross-sectional view of the seat track attachment assembly and hybrid contoured load-spreading washers.

In typical application, a pair of the washers 18 is provided on a pair of fasteners 23, respectively, which secures the seat track 10 to the floor beam web 2. As shown in FIG. 2, a pair of spaced-apart fastener openings 14 extends through the bottom track flange 11 of the seat track 10. Fastener openings 3 also extend through the metal floor beam cap 6 and the composite floor beam cap 7 in registering relationship with respect to the fastener openings 14 in the bottom track flange 11. As further shown in FIG. 2, each fastener 23 has a fastener head 24 which typically engages the bottom track flange 11. Each fastener 23 is adapted to extend through each fastener opening 14 and corresponding pair of fastener openings 8, respectively, and receives a securing nut 27 which typically engages the corresponding washer 18 in assembly of the seat track attachment assembly 1.

As shown in FIG. 1, each washer 18 includes a washer body 19 having a generally triangular shape. The washer body 19 includes a pair of washer sides 26 which are disposed in angular relationship with respect to each other. A concave washer gap 22 forms a third side of the washer body 19 and extends between the washer sides 26. Accordingly, as will be hereinafter described, the washer gap 22 of each washer body 19 substantially conforms to the contour of a web ridge 3 in the floor beam web 2.

As shown in FIG. 2, the washer body 19 of each washer 18 includes a highly-biased composite layer 20 and a metal layer 21 which is bonded to the composite layer 20. In some embodiments, the composite layer 20 is graphite/epoxy. In some embodiments, the metal layer 21 is 6A1-4V titanium. The composite layer 20 is highly biased along an axis of high bias composite 30 (FIG. 3) which is generally parallel to the plane of the washer body 19.

A typical method of fabrication of the washer body 19 includes laminating the composite layer 20 to a metal (typically 6A1-4V titanium) sheet (not shown) which is a precursor to the metal layer 21, followed by cutting of the washer sides 26 and washer gap 22 to form the generally triangular shape of the washer body 19. A fastener opening 25 extends through the composite layer 20 and the metal layer 21, at substantially the center of the washer body 19. The washer body 19 and the fastener opening 25 may be formed using waterjet cutting techniques or alternative cutting techniques which are known to those skilled in the art.

The fastener opening 25 is adapted to receive the corresponding fastener 23 as the fastener 23 is extended through the corresponding fastener opening 14 provided in the bottom track flange 11 of the seat track 10 and the registering fastener openings 8 provided in the composite floor beam cap 7 and the metal floor beam cap 6, respectively. The nut 27 is threaded on the fastener 23 and typically tightened against the metal layer 21 of the washer body 19 to secure the washer 18 against the metal floor beam cap 6. As shown in FIG. 1, the washer notch 22 provided in the washer body 19 of each washer 18 receives and engages a complementary-shaped web ridge 3 of the floor beam web 2.

Figure 3:
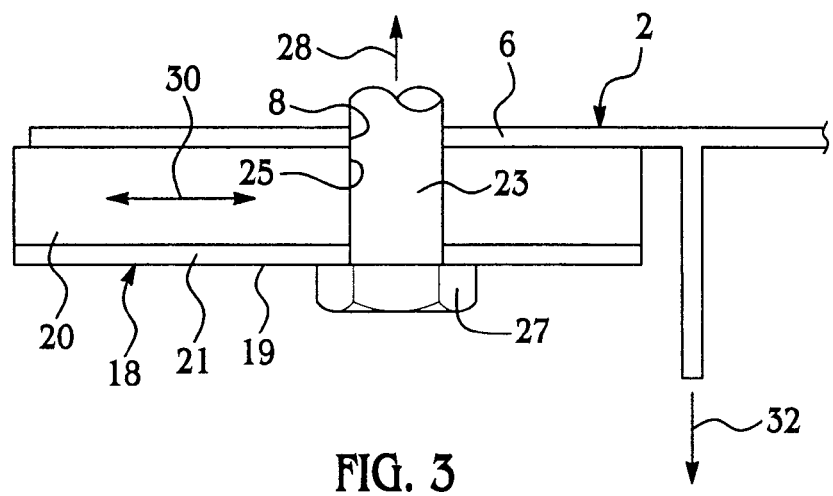
FIG. 3 is a cross-sectional view of a hybrid contoured load-spreading washer, fastened to a floor beam web of the seat track attachment assembly and more particularly illustrating direction of a high bias component load and a web tension load in the washer upon application of loads to the assembly.

In typical application, the seat track assembly 1 is designed to support multiple aircraft passenger seats (not shown) which are attached to the top track flange 12 of the seat track 10 using fastening techniques which are known to those skilled in the art. Under crash conditions the seat track 10 applies tensile loads, particularly crash loads, to each fastener 23. Each washer 18 transmits the crash loads from the corresponding fastener 23 to the floor beam web 2. As shown in FIG. 3, the crash loads typically include a primary fastener load 28 which is applied by each fastener 23 and nut 27 to the corresponding washer 18. The composite layer 20 of each washer 18 spreads or distributes a substantial portion of this primary fastener load 28 along the axis of high bias composite 30 of the composite layer 20. The resulting tensional load 32 is applied to the floor beam web 2. The highly-biased property of the composite layer 20 along the axis of high bias composite 30 facilitates "beaming" or distribution of a substantial proportion of the primary fastener load 28 closely to the floor beam web 2. Consequently, the primary fastener load 28 is spread out or distributed over a larger portion of the floor beam web 2 than is the case with respect to conventional, monolithic radius-filling washers. This facilitates efficient transmission of the crash loads from the seat track 10 to the floor beam web 2 without the need to increase the gage or thickness of the floor beam web 2. The typically titanium metal layer 21 on the washer body 19 of each washer 18 acts as a compressive caul plate by absorbing the bearing load from each corresponding nut 27.

Figure 4:
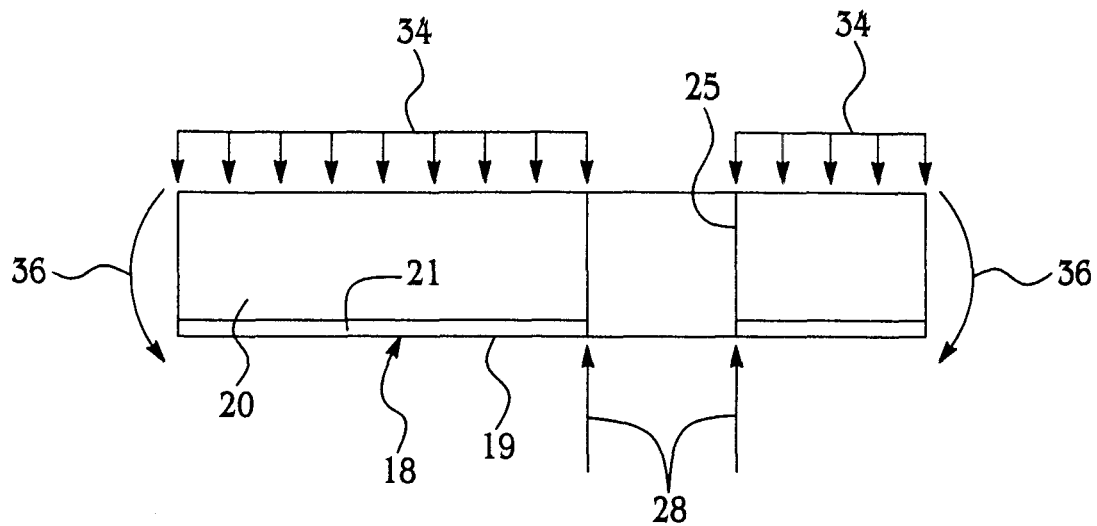
FIG. 4 is a cross-sectional view of a hybrid contoured load-spreading washer, more particularly illustrating a primary bolt load, a distributed reaction load and induced loading movements upon application of a load to the washer.
Figure 5:
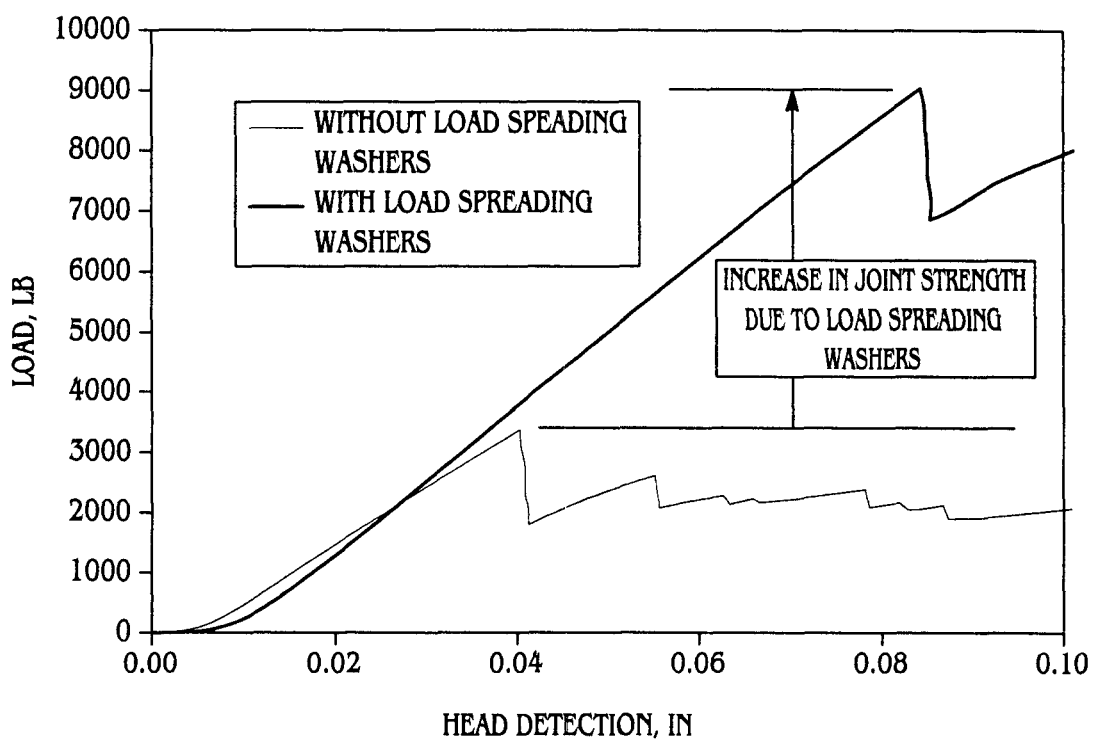
FIG. 5 is a graph which illustrates load-bearing performance of a hybrid contoured load-bearing washer.

FIG. 4 illustrates a distributed reaction load 34 and induced bending movement 36 in relation to the primary fastener load 28 applied to the washer body 19 of each washer 18 during crash loading. The graph of FIG. 5 illustrates load-bearing performance of a hybrid contoured load-bearing washer 1 with head deflection (in inches) of each fastener expressed as a function of the load (in lbs.) applied to each fastener.

Although this invention has been described with respect to certain exemplary embodiments, it is to be understood that the specific embodiments are for purposes of illustration and not limitation, as other variations will occur to those of ordinary skill in the art.

What is claimed is:

1. An apparatus, comprising:
   a body comprising a fiber and polymer composite layer and a metal layer laminated to said fiber and polymer composite layer;
   a fastener opening extending through said body,
   said body defined by at least three sides, wherein one of said three sides comprises a contour to matingly engage and correspond to a corresponding contour of a structure to substantially fill a gap between a fastener and the structure to enable a load applied to the fastener to be at least partially distributed from the fastener, through the body, to the structure, the one of said three sides is substantially non-perpendicular relative to an axis of the fastener opening.

2. The apparatus of claim 1 wherein said fiber and polymer composite layer comprises graphite and epoxy.

3. The apparatus of claim 1 wherein said metal layer comprises a titanium alloy.

4. The apparatus of claim 1, wherein the load applied to the fastener is to be at least partially distributed from the fastener, through the body relative to an axis thereof, to the structure.

5. An assembly, comprising:
   a first beam;
   a beam cap having at least one fastener opening provided on said first beam;
   a second beam having at least one fastener opening provided on said second beam;
   at least one fastener extending through said at least one fastener opening of said second beam and said at least one fastener opening of said first beam;
   at least one washer including a washer body having a composite layer and a metal layer bonded to said composite layer and a fastener opening extending through said composite layer and said metal layer;
   wherein said at least one fastener extends through said fastener opening of said washer body and said composite layer of said washer body engages said beam cap; and
   wherein a surface of said washer body is to engage a beam web of said first beam to enable a load applied to said fastener to be at least partially distributed from said fastener, through said washer body, to said first beam.

6. The assembly of claim 5 wherein said at least one washer comprises a pair of washers and said at least one fastener comprises a pair of fasteners.

7. The assembly of claim 5 wherein said composite layer of said washer body comprises graphite and epoxy.

8. The assembly of claim 5 wherein said metal layer of said washer body comprises a titanium alloy.

9. The assembly of claim 5 wherein said composite layer of said washer body is biased along an axis disposed in a generally parallel relationship with respect to a plane of said washer body.

10. The assembly of claim 5 wherein said washer body has a generally triangular shape.

11. The seat track attachment assembly of claim 5 wherein said washer body has a generally triangular shape defined by three sides wherein one of said three sides comprises a concave notch shape.

12. The assembly of claim 5, wherein the first beam comprises a floor beam and the second beam comprises a seat track.

13. A method of transmitting a load from a first beam to a beam web of a second beam, comprising:
   providing at least one washer including a washer body having a composite layer in engagement with a beam web, a metal layer bonded to said composite layer and a fastener opening extending through said washer body;
   extending a fastener through at least one fastener opening in a first beam, at least one fastener opening in a beam cap and said fastener opening in said washer body to enable a primary fastener load to be transmitted from said first beam to said beam web through said fastener and said washer body, respectively.

14. The method of claim 13 wherein said composite layer of said washer body comprises graphite and epoxy and said metal layer of said washer body comprises a titanium alloy.

15. The method of claim 13 wherein said composite layer of said washer body is biased along an axis disposed in a generally parallel relationship with respect to a plane of said washer body.

16. The method of claim 13 further comprising a plurality of web ridges provided in said beam web and a washer notch provided in said washer body and receiving one of said plurality of web ridges.

17. The method of claim 13 wherein said washer body has a generally triangular shape defined by three sides wherein one of said three sides comprises a concave notch shape.

18. The method of claim 13 wherein said first beam comprises a seat track and said second beam comprises a seat track attachment assembly having the beam cap between said seat track and said beam web.

19. An apparatus, comprising:
   a body including a metallic layer coupled to a composite layer, the body comprising:
      an aperture to receive a fastener;
      a first side comprising a first planar surface;
      a second side comprising a second planar surface; and
      a third side comprising a contoured surface to correspond to a portion of a beam web, the contoured surface substantially non-perpendicular relative to an axis of the aperture.

20. The apparatus of claim 19, wherein the first side is coupled to the second side by a first curved surface, the first side is coupled to the third side by a second curved surface, and the second side is coupled to the third side by a third curved surface.

\* \* \* \* \*